(12) United States Patent
Südow et al.

(10) Patent No.: US 8,573,050 B2
(45) Date of Patent: Nov. 5, 2013

(54) METHODS AND SYSTEMS FOR STREAMER DEPTH PROFILE CONTROL

(75) Inventors: Mattias Südow, Solna (SE); Einar Nielsen, Bekkestua (NO)

(73) Assignee: PGS Geophysical AS, Oslo (NO)

( * ) Notice: Subject to any disclaimer, the term of this patent is extended or adjusted under 35 U.S.C. 154(b) by 109 days.

(21) Appl. No.: 13/193,502

(22) Filed: Jul. 28, 2011

(65) Prior Publication Data
US 2013/0025362 A1 Jan. 31, 2013

(51) Int. Cl.
*G01C 5/00* (2006.01)
*G01V 1/38* (2006.01)

(52) U.S. Cl.
USPC .......... 73/170.32; 73/170.29; 367/15; 367/16

(58) Field of Classification Search
None
See application file for complete search history.

(56) References Cited

U.S. PATENT DOCUMENTS

| | | | |
|---|---|---|---|
| 5,619,474 A | 4/1997 | Kuche | |
| 6,144,342 A | 11/2000 | Bertheas et al. | |
| 7,142,481 B1 | 11/2006 | Metzbower et al. | |
| 7,167,412 B2 | 1/2007 | Tenghamn | |
| 7,298,672 B1 | 11/2007 | Tenghamn et al. | |
| 7,404,370 B2 | 7/2008 | Stokkeland | |
| 7,457,193 B2 | 11/2008 | Pramik | |
| 7,658,161 B2 | 2/2010 | Toennessen et al. | |
| 7,800,976 B2 | 9/2010 | Stokkeland et al. | |
| 7,834,632 B2 | 11/2010 | Tenghamn et al. | |
| 7,881,153 B2 | 2/2011 | Stokkeland et al. | |
| 2008/0192570 A1 | 8/2008 | Tenghamn et al. | |
| 2009/0262601 A1* | 10/2009 | Hillesund et al. | 367/16 |
| 2010/0172205 A1* | 7/2010 | Hillesund et al. | 367/15 |
| 2011/0103179 A1 | 5/2011 | Vageskar | |
| 2011/0158043 A1* | 6/2011 | Johnstad | 367/16 |
| 2011/0158045 A1* | 6/2011 | Karlsen et al. | 367/20 |
| 2011/0248718 A1* | 10/2011 | SUdow et al. | 324/365 |
| 2011/0317514 A1* | 12/2011 | Sudow et al. | 367/16 |
| 2012/0081995 A1* | 4/2012 | Hillesund et al. | 367/16 |
| 2012/0113746 A1* | 5/2012 | Sudow et al. | 367/16 |
| 2012/0230150 A1* | 9/2012 | Sudow et al. | 367/19 |

FOREIGN PATENT DOCUMENTS

GB 2443843 A 5/2008

OTHER PUBLICATIONS

United Kingdom Search Report for Application No. GB1212305.5, dated: Oct. 26, 2012.
U.S. Appl. No. 12/799,941, filed May 5, 2010, Sudow.
U.S. Appl. No. 12/928,667, filed Dec. 16, 2010, Sudow et al.

* cited by examiner

*Primary Examiner* — Andre Allen

(57) ABSTRACT

Disclosed are methods and systems for controlling depth profiles of marine geophysical sensor streamers as they are towed in a body of water. An embodiment discloses a method for marine geophysical surveying, the method comprising: towing a geophysical sensor streamer in a body of water having a surface and a floor, the geophysical sensor streamer being coupled to a survey vessel by a lead-in cable, the lead-in cable having a length that extends from the survey vessel; adjusting the length of the lead-in cable to cause a forward end of the geophysical sensor streamer to follow a depth profile; and deflecting the geophysical sensor streamer in the vertical plane at one or more spaced apart locations.

25 Claims, 2 Drawing Sheets

METHODS AND SYSTEMS FOR STREAMER DEPTH PROFILE CONTROL

BACKGROUND

The present invention relates generally to the field of marine geophysical surveying. More particularly, in one or more embodiments, this invention relates to methods and systems for controlling depth profiles of marine geophysical sensor streamers as they are towed in a body of water.

Certain types of marine geophysical surveying, such as seismic or electromagnetic surveying, include towing an energy source at a selected depth in a body of water. One or more geophysical sensor streamers also may be towed in the water at selected depths. The streamers are essentially long cables having geophysical sensors disposed thereon at spaced apart locations. Actuation of the energy source emits an energy field into the body of water. The energy field interacts with the rock formations below the water floor. Energy that interacts with interfaces, generally at the boundaries between layers of rock formations, is returned toward the surface and is detected by sensors on the one or more streamers. The detected energy is used to infer certain properties of the subsurface rock, such as structure, mineral composition and fluid content, thereby providing information useful in the recovery of hydrocarbons.

For certain types of surveying, it can be important that a streamer is maintained as close as possible to a selected depth profile in the water. For example, it may be important in electromagnetic surveying to increase the towing depth with an optimum depth being as close as possible to the seafloor while keeping the streamer as level as possible. This towing arrangement should reduce noise originating from towing the streamer through the water. Devices commonly used to regulate streamer depth include lateral force and depth (LFD) control devices. In one example, the LFD control devices may be equipped with variable-incidence wings that are rotably fixed onto the streamer. When used in conjunction with pressure sensors capable of generating a signal related to depth, the LFD control devices may be used to regulate streamer depth. Hydrodynamic depressors may also be deployed to increase the towing depth of the streamer. For instance, hydrodynamic depressors may be deployed on the spreader lines, for example, to provide downward thrust as the streamer is towed through the water, thereby forcing down the forward ends of the streamers.

Some survey conditions necessitate towing of streamers over a seafloor that has a varying topography. While LFD control devices and hydrodynamic devices may be sufficient to maintain streamer depth for a flat seafloor, these devices will typically not allow active control of the streamer depth profile to follow a seafloor with a varying topography. Accordingly, the towing depth of the streamers may be limited by safety margins at the shallowest area of the survey area. This limitation is especially problematic in areas with a sloping seafloor or where equipment or natural formations extend above the seafloor.

Accordingly, there is a need for improved methods and systems for controlling depth in electromagnetic surveys, for example, to track the seafloor.

BRIEF DESCRIPTION OF THE DRAWINGS

These drawings illustrate certain aspects of some of the embodiments of the present invention and should not be used to limit or define the invention.

DETAILED DESCRIPTION

The present invention relates generally to the field of marine geophysical surveying. More particularly, in one or more embodiments, this invention relates to methods and systems for controlling depth profiles of marine geophysical sensor streamers as they are towed in a body of water.

One of the many potential advantages of the systems and methods of the present invention, only some of which are disclosed herein, is that a marine geophysical sensor streamer may be towed with a depth profile that generally tracks the seafloor topography. For example, some embodiments enable towing a streamer to optimally follow the survey area bathymetry, thereby optimizing the signal-to-noise, ratio in the received signal. Additionally, some embodiments enable individual streamers with different depth profiles relative to each other. In contrast to conventional systems, the methods and systems of the present invention may not be limited by the safety margin at the shallowest area of the survey area.

Figure 1:
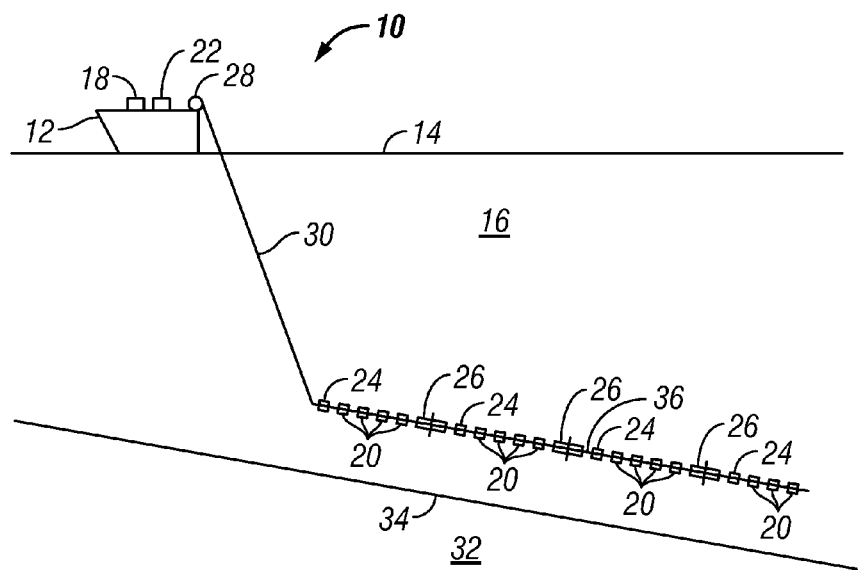
FIG. 1 is a schematic diagram illustrating a geophysical survey system in accordance with embodiments of the present invention.

FIG. 1 illustrates a marine geophysical survey system 10 in accordance with one embodiment of the present invention. In the illustrated embodiment, the system 10 may include a survey vessel 12 that moves along the surface 14 of a body of water 16, such as a lake or ocean. The vessel 12 may include equipment, shown generally at 18 and collectively referred to herein as a "recording system." By way of example, the recording system 18 may include one or more devices (none shown separately) for determining geodetic position of the vessel 12 (e.g., a global positioning system satellite receiver signal), detecting and making a time indexed record of signals generated by each of a plurality of geophysical sensors 20 (explained further below), and/or for actuating one or more energy sources (not shown) at selected times. The energy sources may be any selectively actuable sources suitable for subsurface geophysical surveying, including, without limitation seismic air guns, water guns, vibrators or arrays of such devices, or one or more electromagnetic field transmitters.

The vessel 12 further may include equipment, shown generally at 22 and collectively referred to herein as a "depth control system." By way of example, the depth control system 22 may include one or more devices (none shown separately) for determining a streamer depth profile, receiving signals generated by a plurality of depth sensors 24 (explained further below), transmitting signals to a plurality of LFD control devices 26 (explained further below), and/or sending control signals to a winch 28. In one embodiment, the depth control system 22 may include a computer system having, for example, a central processing unit. The winch 28 may be any of a variety of different spooling devices suitable for use in geophysical survey systems that can be used to change the length of a lead-in cable 30 (explained further below), thus raising or lowering the forward (with respect to the towing direction) end of the streamer 36 (explained further below).

The winch 28 may receive control signals from the depth control system 22 to deploy or retrieve the lead-in cable 30, as desired, for example, to generally follow the topography of the water floor 34.

The geophysical sensors 20 may be, without limitation, seismic sensors such as geophones, hydrophones, or accelerometers, or electromagnetic field sensors, such as electrodes or magnetometers. The geophysical sensors 20 may generate response signals, such as electrical or optical signals, in response to detecting energy emitted from the source (not shown) after the energy has interacted with rock formations 32 below the water floor 34.

As illustrated by FIG. 1, the system 10 may further include a streamer 36 on which the geophysical sensors 20 may be disposed at spaced apart locations along the length of the streamer 36. In an embodiment, the streamer 36 may be formed by coupling a plurality of streamer segments end-to-end, for example, as explained in U.S. Pat. No. 7,142,481, the disclosure of which is incorporated herein by reference. The streamer segments may be coupled by assembling termination plates (not shown) at each end of each streamer segment. In the illustrated embodiment, the streamer 36 includes LFD control devices 26 at spaced apart locations along the length of the streamer 36. In one embodiment, the LFD control devices 26 are disposed at selected couplings between streamer segments. The LFD control devices 26 may be deployed, for example, to regulate streamer depth so that the streamer 36 may be kept as level as possible at a single specified depth while towed through the water 16. By way of further example, the LFD control devices 26 may be deployed to regulate tilt angle of the various segments of streamer 36 to maintain the streamer 36 with as uniform as possible tilt angle while towed through the water 16. In specific embodiments, the streamer 36 may be maintained so that its depth profile can generally match the topographic profile of the water floor 34, which may be parallel to the horizontal plane or sloped. The LFD control devices 26 may be any of a variety of different devices suitable for regulating streamer depth and/or tilt angle, including "birds" having variable-incidence wings. One example of an LFD control device 26 that may be coupled between streamer segments is described in U.S. Patent Application No. 2008/0192570, the disclosure of which is incorporated herein by reference. Another example of an LFD control device 26 is described in U.S. Pat. No. 6,144,342.

The streamer 36 may also include depth sensors 24 disposed at spaced apart locations along the length of the streamer 36. In some embodiments, the depth sensors 24 may be pressure sensors. For example, the depth sensors 24 may be configured to measure pressure in the water 16, which may provide an approximate indication of the depth of the streamer 36 in the water 16 at the position of the depth sensors 24. As previously mentioned, the signals generated by the depth control devices 26 may be transmitted to the depth control system 22 in accordance with certain embodiments.

The streamer 36 may be coupled to the survey vessel 12 using the lead-in cable 30. In the illustrated embodiment, the lead-in cable 30 is used, for example, to deploy the streamer 36 from the seismic vessel 12 and to maintain the streamer 36 at a selected distance behind the vessel 12. As discussed previously, the lead-in cable 30 may be deployed by a winch 28 such that the length of the lead-in cable 30 extending from the vessel 12 may be changed, for example. The lead-in cable 30 may be, for example, any of a variety of spoolable cables suitable for use in geophysical survey systems, including, without limitation, armored cables, or any similar device. In some embodiments, the lead-in cable 30 may transmit towing force from the vessel 12 to the streamer 36. In some embodiments, the lead-in cable 30 may communicate power and/or signals between the components on the vessel 12 (e.g., the recording system 18, the depth control system 22) and the various electronic components (e.g., geophysical sensors 20, LFD control devices 26) on the streamer 36.

As previously mentioned, embodiments of the present invention may be used to control the depth profile of the streamer 36 as it is towed through the water 16. For example, embodiments may include controlling the depth profile of the streamer 36 so that the streamer 36 generally follows the topography of the water floor 34. The topography of the water floor 34 may be determined using any suitable technique for determining the contours of the water floor 34, including using data collected from an echo sounder, a sonar, and/or a global navigation satellite system, for example. In one embodiment, a bathymetry model may be developed using the collected data. The bathymetry model can be based, for example, on sonar data from adjacent survey lines or a priori knowledge of the survey area's bathymetry. It should be understood that streamer depth adjustments should be minimized during geophysical survey operations, for example, to reduce streamer motion induced noise. Accordingly, embodiments may be used with a selected depth profile for the streamer 36 that is based on the bathymetry model to lessen, or even avoid, the need for sudden changes in depth.

The depth profile of the streamer 36 may be maintained to generally follow the topography of the water floor 34 where the depth profile of the streamer 36 is actively controlled to cause the streamer 36 to maintain a generally constant distance from the water floor 34. It should be understood that due to variables, such as speed of the vessel 12 and current in the water 16, among others, an exactly constant distance from the water floor 34 may be difficult to maintain. Indeed, a constant distance may be difficult to achieve, for example, where the water floor 34 has a sudden or drastic change in depth. Those of ordinary skill in the art will appreciate, however; that the depth profile of the streamer 36 may be controlled so that variations in the streamer profile are less than 1 meter per 1000 meters of streamer length, for example. It should be understood that a large threshold for this variance in the streamer profile may result in increased noise.

In some embodiments, controlling the depth profile of the streamer 36 may include adjusting the length of the lead-in cable 30 that extends from the vessel 12. For example, the length of the lead-in cable 30 may be adjusted in response to changes in the topography of the water floor 34. In accordance with embodiments of the present invention, the depth control system 22 may send signals to cause the winch 28 to adjust the length of the lead-in cable 30 that extends from the vessel 12. By adjusting the length of the lead-in cable 30, the depth profile for the end of the streamer 36 closest to the vessel 12 ("forward end") may be controlled to follow the topography of the water floor 34. In present embodiments, the depth control system 22 may include programming instructions to send a control signal to the winch 28 to either deploy or retrieve the lead-in cable 30 so that the forward end of the streamer 36 follows the topography of the water floor 34. For example, if desired to reduce the depth of the forward end of the streamer 36, the depth control system 22 may send a signal to cause the winch 28 to retrieve the lead-in cable 30. Conversely, if desired to increase the depth of the forward end of the streamer 36, the depth control system 22 may send a signal to cause the winch 28 to deploy the lead-in cable 30.

In some embodiments, controlling the depth profile of the streamer 36 may include deflecting the streamer 36 at one or more points in the vertical plane at one or more spaced apart locations. By vertically deflecting the streamer 36, the depth profile may be controlled, for example, more precisely follow the topography of the water floor 34 as the length of the lead-in cable 30 is adjusted. For example, the streamer 36 may be vertically deflected so that the entire streamer 36 may be maintained in a generally straight line with generally uniform tilt as the streamer 36 is towed through the water 16. In embodiments, the LFD control devices 26 may be used to generate vertical force (e.g., upward force, downward force) that deflects the streamer 36. If desired to deflect the streamer 36 downward at a particular location, the LFD control device 26 may be caused to generate downward force, thus forcing down the portion of the streamer 36 proximate the particular LFD control device 26. Conversely, if desired to deflect the streamer 36 upward at a particular location, the LFD control device 26 may be caused to generate upward force, thus forcing up the portion of the streamer 36 proximate the particular LFD control device 26.

In some embodiments, the depth control system 22 may send signals to the LFD control devices 26 to cause the LFD control devices 26 to generate vertical force that deflects the streamer 36. For example, the depth control system 22 may send a selected tilt angle to each LFD control device 26. As the streamer 36 is towed, the tilt angle for each of the LFD control devices 26 may be updated so that the depth profile for the streamer 36 can generally follow the topography of the water floor 34. Tilt control of the streamer 36 will be discussed in more detail below with respect to FIG. 4. By way of further example, the depth control system 22 may send a selected depth to each LFD control device 26. To accommodate non-uniform topographies, the selected depth and/or tilt angle may be different for each LFD control device 26. As the streamer 36 is towed, the depth of each LFD control device 26 can be updated at regular intervals so that the streamer 36 can generally follow the topography of the water floor 34. Each LFD control device 26 may then generate vertical force to raise or lower sections of the streamer 36 until the measurements by the associated depth sensor 24 are within a selected threshold of the selected depth for the particular LFD control device 26.

One example for controlling the depth profile of the streamer 36 is illustrated by FIG. 1. As illustrated, the water floor 34 has a profile that slopes upward with the depth of the water floor 34 becoming shallower as the streamer 36 is towed through the water 16. In accordance with embodiments of the present invention, the depth control system 22 may send signals to cause the winch 28 to retrieve the lead-in cables 30 as the streamer 36 is towed through the water 16 so that the depth profile of the streamer 36 generally follows the sloping profile of the water floor 34. Embodiments may additionally include the depth control system 22 sending signals to cause the LFD control devices 26 to generate upward force thus lifting the portion of the streamer 36 proximate each of the LFD control devices 26. In this manner, the streamer 36 may be maintained, for example, in a generally straight line as it is towed through the water 16.

Figure 2:
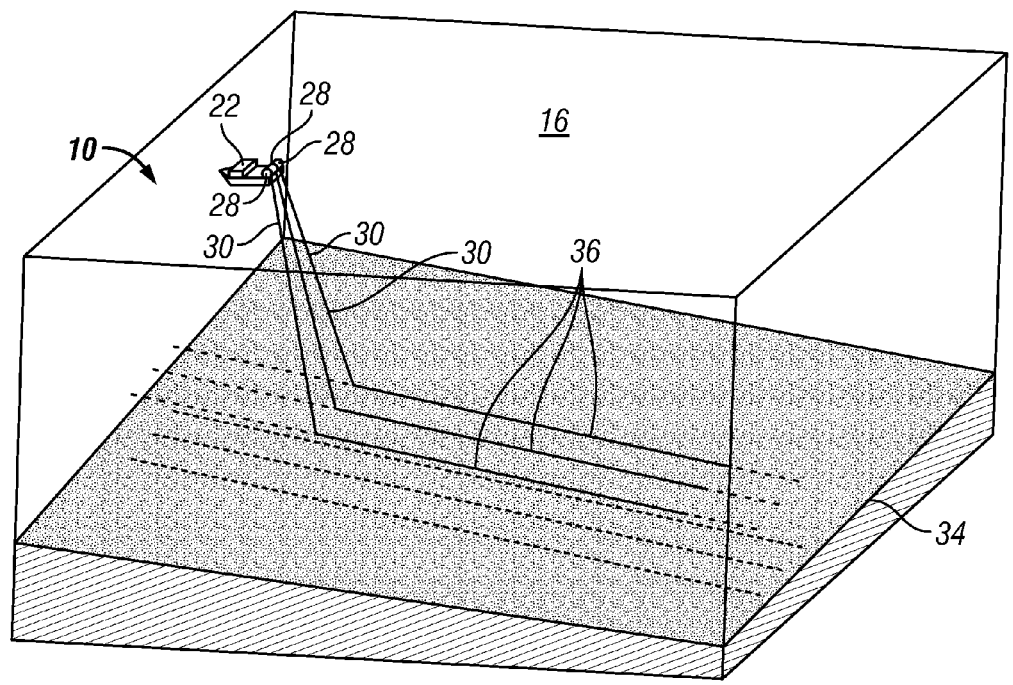
FIG. 2 is a schematic diagram illustrating a geophysical survey system comprising three streamers in accordance with embodiments of the present invention.

FIG. 2 illustrates a marine geophysical survey system 10 in accordance with another embodiment of the present invention. In contrast to the system 10 shown on FIG. 1, this embodiment illustrates that the system 10 may include a plurality of streamers 36 towed through the water 16. In some embodiments, each of the streamers 36 may have a different depth profile. In one embodiment, the depth profile of each of the streamers 36 is individually controlled so that each streamer is at a different depth and/or tilt angle. In the illustrated embodiment, the system 10 includes three streamers 36 that are laterally spaced. It should be noted that, while the present example, shows only three streamers 36, the invention is applicable to any number of laterally spaced apart streamers 36 towed by survey vessel 12 or any other vessel. For simplicity, various components (e.g., geophysical sensors, depth sensors, LFD control devices, etc.) of the streamers 36 are not illustrated on FIG. 2. As illustrated, each of the streamers 36 may be coupled to the survey vessel 12 by a corresponding lead-in cable 30. Each lead-in cable 30 may be deployed from the vessel 12 by a respective winch 28.

As illustrated by FIG. 2, the water floor 34 has a sloped profile. In the illustrated embodiment, the water floor 34 slopes upwardly in a direction that is in front of and to the starboard of the vessel 12. For the streamers to be controlled to follow the topography of the water floor 34 with a depth profile that is a generally constant distance from the water floor 34, each of the streamers 36 may have a different depth profile. For example, each of the streamers 36 may be at different depths and have different tilt angles relative to one another. In some embodiments, the depth control system 22 may send signals to cause each of the winches 28 to retrieve the corresponding one of the lead-in cable 30 so that the depth profile of the respective one of the streamers 36 generally follows the sloping profile of the water floor 34. Embodiments may additionally include the depth control system 22 sending signals to cause the LFD control devices 26 to generate upward force thus lifting the portion of the associated streamer 36 proximate each of the LFD control devices 26. In this manner, the streamers 36 may be maintained, for example, in a generally straight line as they are towed through the water 16.

Figure 3:
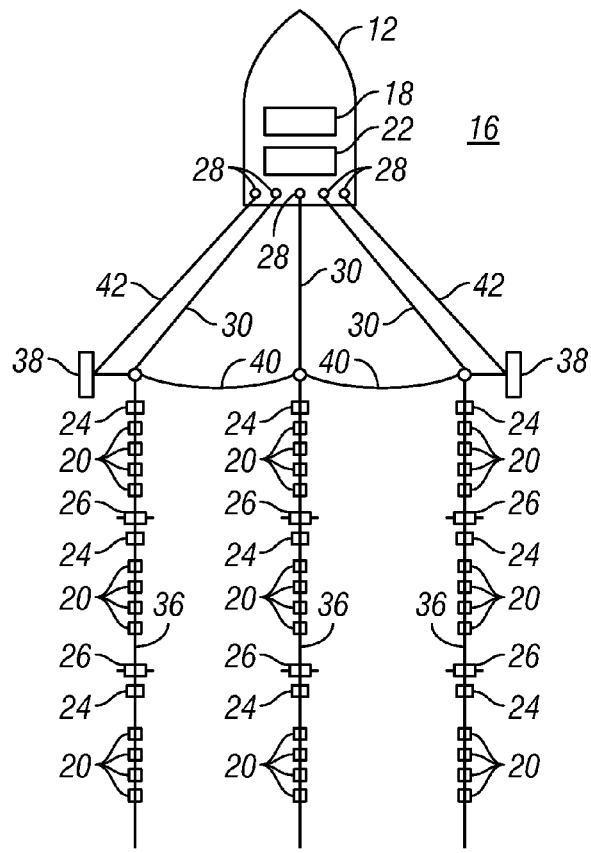
FIG. 3 is a schematic diagram illustrating a geophysical survey system comprising three streamers and submersible deflectors in accordance with embodiments of the present invention.

FIG. 3 illustrates a marine geophysical survey system 10 that uses submersible deflectors 38 that are configured to provide lateral positioning to the outer ones of the streamers 36 in accordance with another embodiment of the present invention. The lateral component of force of each of the submersible deflectors 38 is generally opposed to that of the other of the submersible deflectors 38, and is generally, for example, in a direction transverse to the direction of the motion of the vessel 12. The combined lateral force of the submersible deflectors 38 separates the submersible deflectors 38 from each other until they place the streamers 36 in selected lateral positions. In one example, the separation is selected to place into the tension the spreader lines 40, which interconnect the streamers 36.

Each of the submersible deflectors 38 may be coupled to the survey vessel 12 using a corresponding one of the tow lines 42. In the illustrated embodiment the deflector tow lines 42 are used, for example, to deploy the submersible deflectors 38 from the survey vessel 12 and to maintain the submersible deflectors 38 at a selected distance behind the vessel 12. In one embodiment, the length of the tow lines 42 may be controlled to obtain a desired depth for each submersible deflector 38. As illustrated, each of the tow lines 42 may be coupled at one end to the survey vessel 12 and at the other end to the corresponding one of the submersible deflectors 38. Each of the tow lines 42 may be deployed by a respective winch 28, such that the length of each of the tow lines 42 may be changed, for example. The tow lines 42 may be, for example, any of a variety of spoolable lines suitable for use geophysical survey systems, including, without limitation, fiber ropes, armored cables, or any similar device or combination thereof. In some embodiments, the tow lines, 42 may transmit towing force from the vessel 12 to the submersible deflectors 38. In some embodiments, the deflector tow lines 42 may communicate power and/or signals between equipment on the vessel 12 (e.g., the recording system 18, the depth control system 22)

and the various electronic components (e.g., geophysical sensors 20, LFD control devices 26) of the system 10.

As would be understood by those of ordinary skill in the art with the benefit of this disclosure, the submersible deflectors 38 may be controlled to generate upward force or downward force as desired for a particular application. For example, submersible deflectors 38 may be controlled to generate upward force or downward force in accordance with the disclosure of co-pending U.S. patent application Ser. No. 13/176,665, the disclosure of which is herein incorporated by reference. Accordingly, embodiments may include controlling the submersible deflectors 38 to cause the depth profile of the streamers 36 to track the topography of the water floor 34 (FIGS. 1 and 2). In an embodiment, the depth control system 22 may transmit signals to cause the submersible deflectors 38 to change their yaw and/or roll angles. The "yaw angle," which is sometimes referred to as the "angle of attack," refers to the rotation angle about the vertical axis in relation to the heading of a particular submersible deflector 38 as it is towed through the water 16. The yaw angle can be adjusted to modify the lateral force-generated by the particular submersible deflector 38, thus increasing or decreasing the spread as desired for a particular application. In addition, if the submersible deflector 38 is not connected to a surface reference, adjusting the yaw angle may also result in a new equilibrium, which may be at a different depth. The "roll angle," sometimes referred to as the "heel angle," refers to the rotation angle along the longitudinal axis in the relation to the vertical axis. The roll angle can be adjusted to modify the vertical force generated by the particular submersible deflector 38, thus increasing or decreasing the depth as desired for a particular application. In one embodiment, signals may be sent from the recording system 16 to control the yaw and roll angles of the submersible deflectors 38. By way of example, if the depth of the forward end of the streamers 36 is to be decreased, then the depth control system 22 may transmit signals to cause the submersible deflectors 38 generate upward force. Conversely, if the depth of the forward end of the streamers 36 is to be increased, the depth control system 22 may transmit signals to cause the submersible deflectors 38 to generate downward force. Those of ordinary skill in the art will appreciate that any of a number of different techniques may be used for controlling the yaw and roll angles, including, for example, adjustable flaps or a bridal system.

Figure 4:
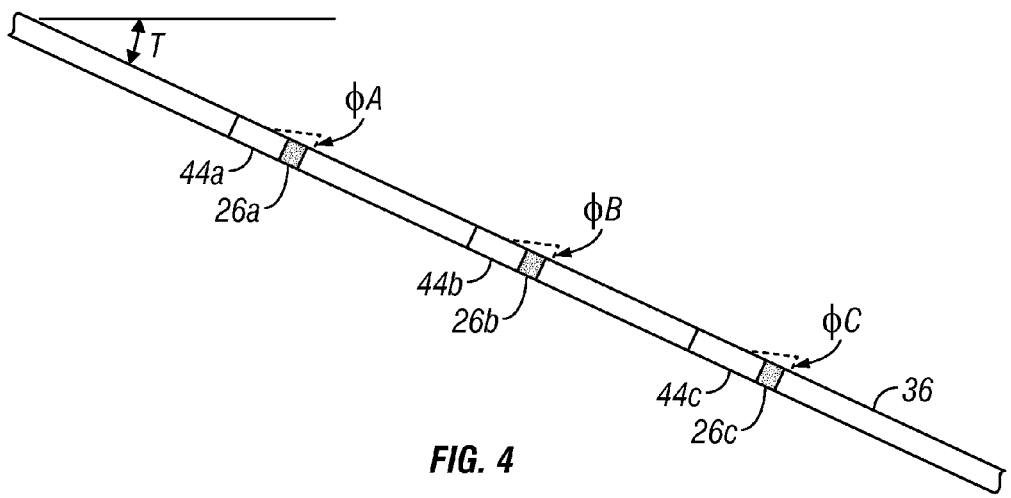
FIG. 4 is a schematic diagram illustrating operation of tilt sensor modules in a geophysical survey system in accordance with embodiments of the present invention.

FIG. 4 illustrates an embodiment for using the LFD control devices 26*a-c* to maintain the streamer 36 at a uniform slope of title angle T. In the illustrated embodiment, each of the LFD control devices 26*a-c* includes an associated tilt sensor module 44*a-c*. In one embodiment, the tilt sensor modules 44*a-c* may be a component of the associated one of the LFD control devices 26*a-c*. In one embodiment, the depth sensors 24 (shown, e.g., on FIG. 1) may each be disposed in one of the tilt sensor modules 44*a-c*. The tilt sensor modules may include, for example, a tilt sensor (not shown) for measuring tilt of the streamer 36. In one embodiment, the tilt sensor may measure tilt of the streamer 36 in the longitudinal dimension. In one particular embodiment, the depth sensor module 24 (shown, e.g., on FIG. 1) may send a selected tilt angle T for the streamer 36 to each of the tilt sensor modules 44*a-c*. If the tilt $\theta_A$ sensed by the tilt sensor module 44*a* is less than T, then the tilt sensor module 44*a* should cause the LFD control device 26*a* to generate upward force, thus lifting the portion of the streamer 36 proximate the LFD control device 26*a*. Conversely, if the tilt $\theta_A$ sensed by the tilt sensor module 44*a* is greater than T, then the tilt sensor module 44*a* should cause the LFD control device 26*a* to generate downward force, thus forcing down the portion of the streamer 36 proximate the LFD control device 26*a*. A more detailed description of tilt control is disclosed in U.S. patent application Ser. No. 12/928,667, the disclosure of which is incorporated herein by reference.

Those of ordinary skill in the art will appreciate that the methods and systems of the present invention should enable towing of marine geophysical sensor streamers with depth profiles that generally track the seafloor topography. In accordance with present embodiments, the methods and systems may be used to tow streamers at a depth of at least about 25 meters. In one embodiment, the streamers may be towed a depth of at least about 100 meters and at a depth up to about 500 meters or more, in another embodiment. In some embodiments, the methods and systems may be used to tow streamers generally within about 100 meters of the water floor 34 and, alternatively within about 50 meters of the water floor 34.

If there is a conflict in the usages of a word or term in this specification and or more patent or other documents that may be incorporated herein by reference, the definitions that are consistent with this specification should be adopted for the purposes of understanding this invention.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee.

What is claimed is:

1. A method for marine geophysical surveying, comprising:
   towing a geophysical sensor streamer in a body of water having a surface and a floor, the geophysical sensor streamer being coupled to a survey vessel by a lead-in cable, the lead-in cable having a length that extends from the survey vessel;
   adjusting the length of the lead-in cable to cause a forward end of the geophysical sensor streamer to follow a depth profile, wherein the depth profile of the forward end tracks the topography of the floor of the body of water; and
   deflecting the geophysical sensor streamer in the vertical plane at one or more spaced apart locations.

2. The method of claim 1, wherein the depth profile causes the geophysical sensor streamer to be towed within 100 meters of the floor of the body of water.

3. The method of claim 1, wherein the geophysical sensor streamer comprises electromagnetic field sensors disposed at spaced apart locations along the geophysical streamer.

4. The method of claim 1, wherein adjusting the length of the lead-in cable comprises using a winch to deploy or retrieve the lead-in cable.

5. The method of claim 4, further comprising sending a control signal to the winch to cause the winch to deploy or retrieve the lead-in cable.

6. The method of claim 1, wherein deflecting the geophysical streamer comprises generating vertical force with one or more lateral force and depth control devices disposed on the streamer.

7. The method of claim 1, wherein the geophysical sensor streamer is deflected to align the streamer with a selected tilt angle.

8. The method of claim 1, wherein the geophysical sensor streamer is deflected to align one or more segments of the geophysical sensor streamer at selected depths.

9. The method of claim 1, further comprising towing a second geophysical sensor streamer through the body of water that is laterally spaced from the geophysical sensor streamer.

10. The method of claim 9, further comprising towing a third geophysical streamer through the body of water that is laterally between the geophysical sensor streamer and the second geophysical sensor streamer.

11. The method of claim 9, further comprising individually controlling the depth profiles of the geophysical sensor streamer and the second geophysical sensor streamer such that the depth profiles of the geophysical sensor streamer and the second geophysical sensor streamer are different.

12. The method of claim 9, further comprising towing submersible deflectors through the body of water to provide lateral positioning to the geophysical sensor streamer and the second geophysical sensor streamer.

13. The method of claim 12, further comprise adjusting the length of tow lines that couple the submersible deflectors to the survey vessel.

14. The method of claim 12, further comprising controlling the submersible deflectors to modify the depth profile of the geophysical sensor streamer and the second geophysical sensor streamer.

15. The method of claim 1, wherein the depth profile of the streamer is maintained such that variations in streamer profile are less than 1 meter per 1,000 meters of streamer length.

16. The method for marine geophysical surveying of claim 1, wherein the geophysical sensor streamer comprises a lateral force and depth control device, wherein the lateral force and depth control device comprises a tilt sensor module, wherein the tilt sensor module measures the longitudinal tilt of the streamer, and wherein the tilt sensor module causes the lateral force and depth control device to alter the longitudinal tilt of the streamer.

17. A method for marine geophysical surveying, comprising:

towing a geophysical sensor streamer in a body of water having a surface and a floor, the geophysical sensor streamer being coupled to a survey vessel by a lead-in cable, the lead-in cable having a length that extends from the survey vessel;

adjusting the length of the lead-in cable in response to changes in the topography of the floor of the body of water; and deflecting the geophysical sensor streamer in the vertical plane at one or more spaced apart locations.

18. A marine geophysical survey system, comprising:
a survey vessel;
a winch disposed on the survey vessel;
a geophysical sensor streamer;
a lead-in cable coupled at one end to the geophysical sensor streamer and at the other end to the winch;
lateral force and depth control devices disposed at spaced apart locations on the geophysical sensor streamer; and
a depth control system configured to send signals to cause the winch to adjust the length of the lead-in cable to cause a forward end of the geophysical sensor streamer to follow a depth profile, wherein the depth profile of the forward end tracks the topography of a water floor above which the geophysical streamer is to be towed.

19. The marine geophysical survey system of claim 18, further comprising electromagnetic field sensors disposed at spaced apart locations along the geophysical sensor streamer.

20. The marine geophysical survey system of claim 18, further comprising a second geophysical sensor streamer coupled to the survey vessel that is laterally spaced from the geophysical sensor streamer.

21. The marine geophysical survey system of claim 20, further comprising a third geophysical sensor streamer that is laterally between the geophysical sensor streamer and the second geophysical sensor streamer.

22. The marine geophysical survey system of claim 20, wherein the depth control system is configured to individually control the depth profiles of the geophysical sensor streamer and the second geophysical sensor streamer.

23. The marine geophysical survey system of claim 18, wherein the depth control system is configured to send selected depth profiles to each of the lateral force and depth control devices as the geophysical sensor streamer is towed through the water.

24. The marine geophysical survey system of claim 18 wherein the depth control system is configured to send a selected tilt angle to each of the lateral force and depth control devices as the geophysical sensor streamer is towed through the water.

25. The marine geophysical survey system of claim 18, wherein the lateral force and depth control device comprises a tilt sensor module, wherein the tilt sensor module is configured to measure the longitudinal tilt of the streamer; and wherein the tilt sensor module is configured to cause the lateral force and depth control device to alter the longitudinal tilt of the streamer.

* * * * *